United States Patent [19]

Hentzelt et al.

[11] 4,173,668

[45] Nov. 6, 1979

[54] FIRE-SCREENING PANEL

[75] Inventors: Walther E. Hentzelt, Witten-Annen; Hans-Henning Nolte; Wolf von Reis, both of Gelsenkirchen, all of Fed. Rep. of Germany

[73] Assignee: BFG Glassgroup, Paris, France

[21] Appl. No.: 636,745

[22] Filed: Dec. 1, 1975

[30] Foreign Application Priority Data

Dec. 3, 1974 [DE] Fed. Rep. of Germany ....... 2457037

[51] Int. Cl.² .................... B32B 17/06; B32B 15/04
[52] U.S. Cl. ..................................... 428/34; 52/171; 156/99; 428/426; 428/428; 428/432; 428/920
[58] Field of Search ............... 428/34, 920, 921, 426, 428/428, 410, 81; 156/99; 52/171, 616

[56] References Cited

U.S. PATENT DOCUMENTS

| 3,531,313 | 9/1970 | Dates | 428/432 |
| 3,537,944 | 11/1970 | Grubb et al. | 428/34 |
| 3,630,809 | 12/1971 | Edwards | 428/428 |
| 3,640,837 | 2/1972 | Gaeth et al. | 428/428 |
| 3,935,681 | 2/1976 | Voiturier et al. | 52/171 |
| 3,959,565 | 5/1976 | Jordan et al. | 428/432 |

FOREIGN PATENT DOCUMENTS

| 6919667 | 2/1970 | Netherlands | 428/428 |
| 933410 | 1/1963 | United Kingdom. | |

Primary Examiner—George F. Lesmes
Assistant Examiner—P. Thibodeau
Attorney, Agent, or Firm—Cushman, Darby & Cushman

[57] ABSTRACT

A fire-screening panel is provided that maintains its effectiveness in preventing fire propagation even after aging of the panel. The panel comprises a first structural ply formed from a vitreous sheet, and a second structural ply, with a layer of intumescent material disposed therebetween. Other plies may also be provided, and the plies are clamped together in face-to-face relationship, and/or bonded together. At least one ply of the panel has an infra-red reflecting coating disposed thereon, remote from the intumescent material, which coating provides for the retained effectiveness of the fire-propagating properties of the panel despite aging thereof.

23 Claims, 5 Drawing Figures

FIRE-SCREENING PANEL

BACKGROUND AND SUMMARY OF THE INVENTION

This invention relates to a fire-screening glazing panel comprising a first structural ply formed by a vitreous sheet and at least a second structural ply.

The expression "vitreous material" as used herein comprises glass and vitrocrystalline material. Vitrocrystalline material is formed by subjecting a glass to a thermal treatment so as to induce the formation of one or more crystalline phrases therein.

In the construction of buildings, glazing panels have often to be used in exterior or interior walls or partitions. An obvious example is the use of transparent glazing panels to form windows. Opaque glazing panels are also used, e.g. to form partitions.

Such panels often must satisfy standards of fire resistance, which standards require the panel on the outbreak of fire to have a minimum strength retention time, to be completely flame-proof, and to satisfy certain stringent tests of thermal insulating power to ensure that the panel will prevent propagation of fire by heat radiation from the panel and will not become so hot as to involve risk of seriously burning a person who may touch the panel while it is exposed to fire.

The standard of fire resistance of a given panel can be quantified as a function of the time for which that panel satisfies one or more of the above criteria during a test in which the panel is exposed to the interior of an enclosure whose temperature is raised according to a predetermined schedule.

Ordinary glass panes are not highly thermally insulating or fire resistant. When exposed to fire they become very hot and consequently cannot be touched without the risk of severe burning. Moreover, heat radiation from the pane can itself constitute a further fire-hazard.

It has accordingly been proposed to incorporate a layer of an intumescent material in a panel, e.g., laminated between two sheets of glass (see U.S. Pat. No. 3,640,837; also see British Pat. No. 933,410). The intumescent material most often used is hydrated sodium silicate. If such a laminate is exposed to fire, the combined water in the hydrated sodium silicate layer is driven off, and the layer foams and the material is converted into a porous opaque mass which is very effective as a thermal barrier. Also during such heat-conversion of the layer, its temperature remains substantially constant so that excessive heating of the glass sheet remote from the fire is delayed.

It has been found however, that layers of intumescent material incorporated in light-transmitting panels tend to degrade with age when exposed to the sun or another heat source and that this results in reduced effectiveness on heat-conversion when the panel is exposed to fire, and for transparent panels, results in a loss of overall transparency.

It is an object of the present invention to provide means affording an increase in resistance to aging in fire-screening glazing panels and/or in the degree of fire-resistance.

Accordingly, the present invention, as broadly defined resides in a fire-screening glazing panel comprising a first structural ply formed by a vitreous sheet and at least a second structural ply characterised in that there is provided between said plies at least one layer of intumescent material and such panel includes at least one ply which bears at least one infra-red reflecting coating isolated from said intumescent material.

The intumescent material is isolated from the infra-red reflecting coating material so as to avoid any possibility of reaction between them.

The advantage afforded by the present invention over a correspondingly dimensioned panel which lacks an infra-red reflecting coating will depend, inter alia, on the reflection spectrum of the coating and, when only one coating is present, on the location of the coating with respect to the intumescent layer.

The most important advantages are at present believed to be afforded when the coated ply or plies reflect(s) substantial proportions of incident infra-red radiation having short wavelengths e.g., 0.7 to 3 $\mu$m, and the panel is oriented so that the (or one of the) coated ply is situated so as to protect the intumescent material from solar radiation. The greater part of the infra-red energy radiated by the sun lies in this wavelength range, and it is believed to be this energy which is in larger part to cause of aging of fire-screening panels of the type in view. Accordingly, screening the intumescent material with an infra-red reflecting layer reduces the rate at which a panel degrades with age. The problem of aging of fire-screening panels has been identified, the source of the problem has been identified, and the solution to the problem found.

Another advantage is apparent in the case where the coated ply or plies reflect(s) substantial proportions of radiation having longer wavelengths only, while transmitting substantial proportions of short wavelength infra-red radiation. This is because the greater part of the infra-red energy radiated by a fire has such longer wavelengths. If the or a coated ply is between a fire and the intumescent material, then that material will take longer to heat to a given temperature and will thus provide a more effective thermal barrier. The panel will also age less quickly.

It is often found that infra-red reflecting coatings which act to reflect substantial proportions of short wavelength infra-red radiation have the additional advantage of being effective at longer wavelengths as well.

The panel may include two said coated plies with the or each said layer of intumescent material located between them, so that the requirement to orient the panel in a particular way may be obviated.

Preferably at least one said layer of intumescent material is sandwiched between said first and second structural plies and at least one structural ply of said sandwich bears an infra-red reflecting coating on a face which forms an exterior face of the sandwich since this avoids any risk of degradation of the coating due to its possible reaction with the intumescent material.

Preferably the panel comprises at least one other structural ply in addition to the first and second structural plies. Such an additional ply may for example, be laid up against a reflection-coated face of a said sandwich, and may be bonded thereto. This has the advantage of minimizing the risk of damage to such coating by abrasion or weathering.

In preferred embodiments, the additional structural ply or plies define(s) with said first and/or second structural ply at least one inter-ply space, and at least one ply face which forms a boundary of such a space bears an infra-red reflecting coating. This has the advantage of substantially avoiding any damage to such a coating. In such cases, it is preferred that an infra-red reflecting coating is carried by a face of the or at least one said additional ply, since this is found most convenient. Such a double panel also affords improved thermal insulation.

Preferably there is at least one infra-red reflecting coating which comprises a metal selected from the group consisting of aluminium, copper, gold, silver, palladium. Such metals can form thin coatings which are transparent to visible light and are highly reflective of infra-red radiation. For example, a coating of gold 250 Å thick can afford a visible light transmission of about 30% while reflecting 90% of infra-red radiation having a wavelength equal to 2.5 $\mu$m.

The thickness of a metallic infra-red reflecting coating may be chosen as a function of the desired infra-red reflection and visible light transmission. Thus, for example, a gold coating might have a thickness between 100 Å and 400 Å. In order to give good infra-red reflection, the coating should not normally be thinner, and thicker coatings will not transmit sufficient visible light for use with transparent panels. It should be noted that metallic coatings are effective over a very wide range of wavelengths and thus can screen a panel against infra-red radiation from the sun or from a fire.

A metal coating may be combined with one or more oxide coatings deposited above or below the metal coatings to provide an infra-red filter, as is known. An oxide coating may also be used alone or in combination with other oxides or metallic compounds to form interference filters, as is also well known. Thus, alternatively, or in addition, it is advantageous to provide at least one infra-red reflecting coating which comprises a metal oxide. Such oxides are for example, oxides from silicon, titanium, zirconium, aluminium, tantalum. Other metallic compounds which may be used for the infra-red reflecting coating are for example, sulfides, nitrides and carbides, and other coatings are also suitable.

Advantageously a metal oxide is selected from the group of far-infrared reflecting oxides. For example, an indium oxide coating can give good results especially as regards this range of infra-red radiation having longer wavelengths, say 3 $\mu$m and above. Other oxides, e.g. tin oxide may also be used for this purpose. Such a metal oxide coating may contain a doping agent for example ions of chlorine, fluorine, arsenic or antimony, as is well known. The thickness of such oxide coatings is preferably between 1000 Å and 6000 Å.

The intumescent material may comprise a hydrated metal salt. Examples of metal salts which can be used in hydrated form are as follows: aluminates, plumbates, stannates and alums, e.g. of sodium or potassium; borates, e.g. sodium borate, and phosphates, e.g., orthophosphates of sodium or potassium and aluminium phosphate.

Hydrated alkali metal silicates, e.g., sodium silicate, are also suitable for use in a layer incorporating intumescent material.

Such substances have very suitable properties for use in fire-screening panels. They are in many cases capable of forming transparent layers which adhere well to glass or vitrocrystalline material. On being sufficiently heated, the combined water boils and the layers foams, so that the hydrated metal salt is converted into an opaque solid, porous or cellular form in which it is highly thermally insulating and remains adherent to the glass or vitrocrystalline material.

This feature is particularly important, since even if all the structural plies of the panel are cracked or broken by thermal shock, the panel may retain its effectiveness as a barrier against heat and fumes since the fragments of the plies may remain in position bonded together by the converted metal salt.

In some embodiments, a layer of intumescent material is used which is merely translucent, but preferably the material forms a transparent solid layer at ambient temperature.

The use of hydrated sodium silicate is especially preferred since it can readily be formed into solid transparent layers.

Preferably, first and second structural plies and at least one layer of intumescent material form a laminate whose various plies are bonded together in face-to-face relation.

Advantageously, between said first and second structural plies there is located at least one plastics membrane and, on opposite sides of such membrane(s), layers of intumescent material. This feature has a particular advantage as regards fire resistance. If a panel incorporating such a laminate is exposed to fire, the layer which is nearer the fire intumesces. As this layer is heated, the other intumescent layer is kept at a somewhat lower temperature until conversion of the first layer is completed. This prolongs the time taken for the structural ply further from the fire to become heated to a given temperature, and also reduces any tendency for that ply to become nonuniformly heated. This in turn reduces the possibility that that ply will be broken as a result of thermal shock.

Preferably, at least one said layer intumescent material is between 0.1 mm and 8 mm in thickness. Layers having this range of thickness can be converted to become very effective fire-screening barriers. It is clear that the effectiveness of a fire-screening barrier formed from a layer of given material will depend on its thickness, but also, the transparency of such a layer will be less with increased thickness.

Preferably, a panel according to the invention is transparent, and preferably also, each structural ply comprises a vitreous sheet.

Advantageously, at least one structural ply comprises a tempered vitreous sheet. A tempered vitreous sheet is able to withstand considerable thermal shocks. Chemically tempered sheets are particularly recommended.

BRIEF DESCRIPTION OF THE DRAWINGS

The invention will now be further described by way of example with reference to the accompanying diagrammatic drawings in which.

DETAILED DESCRIPTION OF THE INVENTION

Figure 1:
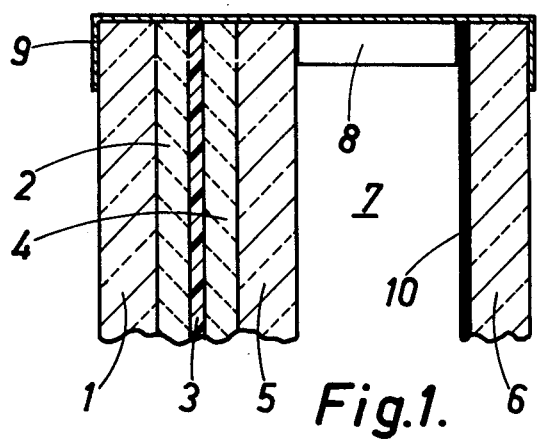
FIGS. 1 to 5 are detailed cross sections of five exemplary embodiments of light-transmitting fire-screening panel according to the invention.

FIG. 1 shows a hollow panel construction comprising a first vitreous sheet 1, a first intumescent layer 2, a plastics membrane 3, a second intumescent layer 4 and a second vitreous sheet 5 which are assembled together in a sandwich. The panel further comprises an additional vitreous sheet 6 in spaced relation to the sandwich. The inter-ply space 7 between the sandwich and the additional sheet 6 is maintained by a spacer member 8 and the panel is held together by a channel frame component 9. An infra-red reflecting coating 10 is carried by that face of the additional sheet 6 which forms a boundary of the inter-ply space 7.

Figure 2:
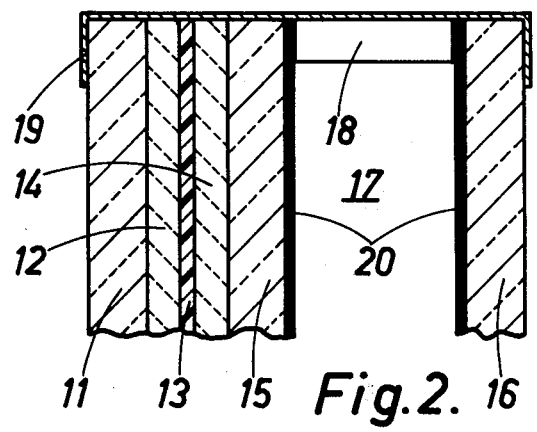

FIG. 2 also shows a hollow panel construction, and in this Figure the sandwich is defined by a first vitreous sheet 11, a first intumescent layer 12, a plastics membrane 13, a second intumescent layer 14 and a second vitreous sheet 15. This panel also comprise an additional sheet, here indicated at 16, spaced from the sandwich. The inter-ply space 17 is maintained by a spacer member 18 and the panel is held together by a channel frame component 19. In this panel, each sheet face which borders on the inter-ply space 17 carries an infra-red reflecting coating 20. These coatings may be of the same or different materials.

Figure 3:
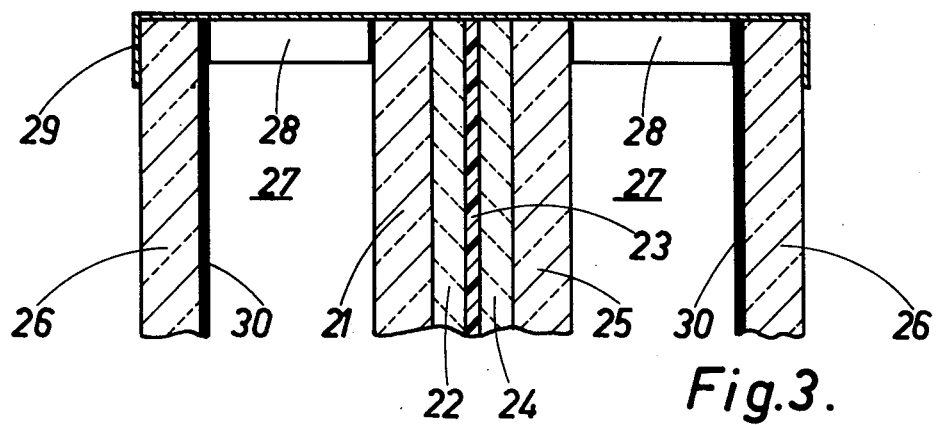

FIG. 3 shows a hollow triple panel in which the sandwiched intumescent material is screened from infra-red radiation from both sides. The sandwich is defined by first and second vitreous sheets 21 and 25 between which are located two intumescent layers 22, 24 on opposite sides of a plastics membrane 23. Spaced apart, on each side of the sandwich, there is provided an additional vitreous sheet 26 and the inter-ply spaces 27 are maintained by spacers members 28 and a channel frame component 29. Infra-red reflecting coatings 30 are provided on each of the faces of the additional vitreous sheets 26 which form a boundary of one of the inter-ply spaces 27. It is usually most convenient for the two additional sheets 26 and their coatings 30 to be indentical, though this is not essential.

It will be noted that in each of the panels illustrated in these three Figures, the infra-red reflecting coating or coatings is or are on a sheet face which is within the body of the panel so that it is or they are protected from mishandling and weathering.

Figure 4:
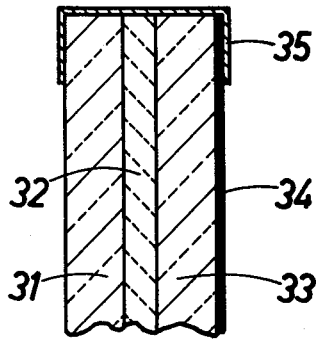

FIG. 4 shows a simpler construction of panel and is constituted as a laminate comprising two vitreous sheets 31, 33 having a layer of intumescent material 32 bonded between them. The second vitreous sheet 33 carries an infra-red reflecting coating 34 on a face thereof which forms an exterior face of the laminated sandwich. As a variation, the exterior face of the first sheet 31 may also carry an infra-red reflecting coating. The panel is surrounded by a channel frame component 35.

Figure 5:
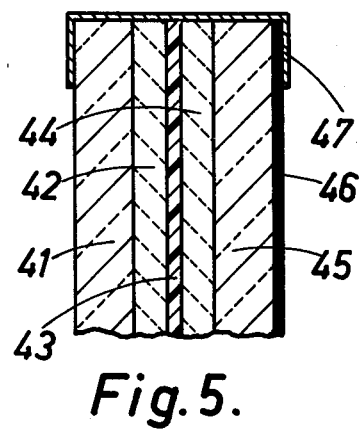

FIG. 5 shows another panel which comprises a sandwich of intumescent material. This sandwich consists of a first vitreous sheet 41, a first intumescent layer 42, a plastics membrane 43, a second intumescent layer 44 and a second vitreous sheet 45 which bears an infra-red reflecting coating 46 on its exterior face. The sandwich is held together to form the panel by means of a channel frame component 47.

EXAMPLE 1

A panel was constructed in accordance with FIG. 1.

Each vitreous sheet 1, 5, 6 is of soda-lime glass of ordinary composition 3 mm thick. the intumescent layers 2, 4 are each of hydrated sodium silicate 2.5 mm thick and disposed on opposite sides of a membrane 3 of polyvinyl butyral 0.76 mm thick.

In order to form the layers 2, 4, hydrated sodium silicate was applied in an aqueous solution having the following properties:

Proportion by weight: ($SiO_2/Na_2O$) = 3.4
Viscosity: 200 centipoises
Specific gravity: 37° to 40° Baumé

This solution was applied to a face of each glass sheet 1, 5 while the sheets were substantially horizontal and at a temperature of 20° C. The solution thus applied was allowed to spread out over the glass sheets.

Currents of warm air were then directed onto the solution in order to dry it. This drying has the effect of driving off excess, unbound water of solution to leave a layer of hydrated sodium silicate on each sheet. After formation of these layers of hydrated sodium silicate on the sheets, the sheets were placed on either side of a sheet 3 of polyvinyl butyral 0.76 mm thick as shown in FIG. 1.

In order to bond the sandwich together to form a laminate, the assembly was placed in a chamber where reduced pressures could be obtained. Reduction in pressure has the effect of removing any air which is trapped between the various place of the sandwich. After reduction of pressure the temperature of the sandwich is raised, also under partial vacuum to 80° C. to reach a pre-bonding stage. After the "prebonding" operation the bonding operation is performed in the classical manner at a pressure of 15 kg./cm$^2$ and at a temperature of 130° C.

This laminated sandwich is held assembled to the additional glass sheet 6 by means of a channel frame 9 and a spacer member 8. The inter-ply space 7 thus defined was filled with dry air, and in order to keep air dry, the channel 9 is glued around the periphery of the panel. On the surface of the additional sheet 6 which faces into the panel there was previously deposited an infra-red reflecting coating 10 of gold 150 Å thick obtained by vacuum evaporation.

When a fire-screening panel according to the present example is subjected to the action of fire, the layer of hydrated sodium silicate applied to the sheet closest to the fire is converted to an opaque porous fire-screening barrier of anhydrous sodium silicate. This anhydrous barrier is somewhat thicker than the hydrated layer from which it was formed, and is a very effective barrier against infra-red radiation. During the course of the conversion, the bound water is driven off and thus contributes to a limitation of the temperature increase in that layer. During this phase the plastics membrane contributes to a tendency to render uniform the temperature across the whole area of the panel, and any local "hot-spots" in the layer first to be converted are reflected in larger hot zones in the second layer. When this first layer is completely dehydrated the other layer of hydrated sodium silicate is in turn converted to form an opaque porous barrier of anhydrous sodium silicate.

These phenomena enable the face of the fire-screening panel which is not directly subjected to the action of fire to be maintained at an acceptable temperature for an increased period of time.

This exemplary panel according to the present invention has many advantages when compared with another similar panel which does not have an infra-red reflecting coating. When the panel without the infra-red reflecting coating is exposed to solar radiation, it degrades during the course of time. The intumescent layers become more and more opaque and bubbles appear in the silicate layers. This degradation does not occur, or at least does not occur until a very much longer time has elapsed in the case of this exemplary panel according to the present invention, providing that the panel is located so that solar radiation must pass through the infra-red reflecting coating 10 on the sheet 6 before it can irradiate the sandwich containing the intumescent material. Furthermore, on the outbreak of fire on the side of the panel of the first sheet 1, it is found that such an infra-red reflecting coating delays heating of the additional sheet 6 thus increasing the time during which that sheet can be touched without risk of being seriously burnt.

As a variation within the scope of the invention, the intumescent layers 2, 4 may be made of hydrated potassium silicate in place of hydrated sodium silicate. Other variations are, of course, also possible in producing an advantageous panel according to the present invention. For instance, one or both of the glass sheets in the sandwich may be replaced by a sheet of vitrocrystalline material, the infra-red reflecting coating may be formed of palladium, the intumescent layers may be formed of hydrated sodium aluminium sulphate, (but in this case it is to be noted that the bonding temperature should be kept below 80° C. to avoid premature intumescence), and the various plies of the sandwich may be simply held clamped together rather than bonded and clamped.

EXAMPLE 2

A panel was made as described in Example 1 with reference to FIG. 1 and was similar thereto in all respects save that the infra-red reflecting coating 10 was constituted as a multi-layer interference coating.

Onto the additional sheet 6 there were successively deposited, by the well-known sputtering technique, a layer of bismuth oxide 100 Å thick, a layer of gold 150 Å thick and a second layer of bismuth oxide, this time 400 Å thick.

This gave the panel a grey tint in reflection, and presented similar advantages to those discussed in Example 1.

EXAMPLE 3

A panel was made as described in Example 1 with reference to FIG. 1. However, before assembly of the panel, that face of the first vitreous sheet 1 which would form an exterior face of the panel was covered with a coating comprising tin oxide doped with antimony oxide (not shown in the drawing).

This coating was 5000 Å thick and was formed in a known manner using a solution of the corresponding chlorides (e.g., $SnCl_4$ and $SbCl_3$).

This panel also presented similar advantages, and furthermore, this tin oxide coating, due to its infra-red radiation reflecting properties, serves to delay intumescence of the layers 2 and 4 when interposed between those layers and a fire, and thus maintains the additional glass sheet 6 at an acceptable temperature for a longer time. This coating also inhibits propagation of fire due to radiation frame a fire through the panel even while the panel is still transparent.

EXAMPLE 4

A glazing panel was constructed in accordance with FIG. 2 and comprised two soda-lime glass sheets 11, 15 each 15 mm thick and two intumescent layers 12, 14 of hydrated sodium phosphate ($Na_2HPO_4.12H_2O$) each 5 mm thick separated by a membrane 13 of polyvinyl butyral 0.76 mm thick.

The layers 12, 14 of hydrated sodium phosphate were obtained by applying an aqueous solution of sodium phosphate on to the glass sheets, and the sheets were then heated to 100° C. in order to drive off the free water without, of course, converting the hydrated sodium phosphate to anhydrous material.

After cooling, the sheets were assembled and their respective heat convertible layers were bonded together on either side of a membrane of polyvinyl butyral to form a laminated sandwich, using a method similar to that described in Example 1, except that the maximum bonding temperature was maintained below 100° C.

This laminate was assembled to an additional glass sheet 16 which was 3 mm thick.

Prior to assembly, those faces of the two glass sheets 15, 16 which were to face the inter-ply space 17 were each provided with a coating 10 of copper 100 Å thick by vacuum evaporation.

This panel affords similar advantages to that described in Example 1.

In a variant, one or both of the copper coatings 20 may be replaced by a coating of aluminium.

In a second variant, the intumescent layers 12, 14 were formed of hydrated sodium silicate.

The adoption of either of these variant features gives similar advantages.

EXAMPLE 5

A transparent fire-screening panel in accordance with FIG. 3 was constructed in which there was a sandwich 21 to 25 formed as described in Example 1 held between and spaced from two additional sheets 26 of glass 3 mm thick. Infra-red reflecting coatings 30 were formed on the inwardly facing surfaces of these two additional sheets.

One such coating was a 150 Å coating of gold formed as described in Example 1, and the other coating was of indium oxide doped with tin ions. This latter coating has a thickness of 2000 Å and was formed by pyrolysis of the corresponding chlorides.

This panel afforded advantages similar to the panel of Example 3.

A similar result can also be obtained if both infra-red reflecting coatings are of the same material (for example, both such coatings can be of gold).

As another variation, the indium oxide coating can be replaced by a coating of titanium nitride; such a titanium nitride coating can be obtained by using the well known cathode sputtering technique.

EXAMPLE 6

A panel was constructed in accordance with FIG. 4 and included a 4 mm glass sheet 31 onto which a 2.5 mm layer 32 of hydrated sodium silicate was deposited by the method given in Example 1. A second glass sheet 33 was given a 250 Å coating of gold 34 to serve as an infra-red reflecting coating. These sheets were then assembled and held together by a frame component 35 as shown.

As in the previous Examples, it was found that by appropriate orientation of the panel, the intumescent layer could be screened from solar infra-red radiation so that age degradation of the panel was very greatly reduced.

On the other hand, if it is desired to use such a panel as an interior partition in a building, for example, between a workshop and a corridor, it would be more appropriate to orient the panel so that its reflective surface was towards the workshop, since there would be a greater likelihood of fire there than in the corridor. In such a case, if fire were to break out in the workshop, infra-red radiation would be reflected back so that intumescence of the silicate layer would be delayed, and consequently, the corridor side of the partition would remain at an acceptable temperature for a longer time.

In one particularly interesting variation according to the present invention, both outer faces of the panel are provided with an infra-red reflecting coating. For example, one face could be given a gold coating as aforesaid, while the other face was coated with tin oxide doped with fluorine ions. Such a coating may be formed using a solution of $SnCl_4$ and $NH_4F.HF$, in the classical manner. As other variations, the coating 34 may be formed by a 100 Å thick layer of silver, and an infra-red reflecting coating may be provided with a protective coating of silica. Silica can form a hard surface coating which will protect the reflective coating from damage due to mishandling or the weather.

EXAMPLE 7

A panel was constructed in accordance with FIG. 5 in which the sheets 41, 45 were each of soda-lime glass 5 mm thick. Each sheet was covered with a 2.5 mm layer of hydrated sodium silicate (42 or 44) and these sheets were then assembled on opposite sides of a 0.38 mm membrane 43 of polyvinyl butyral to form a laminated sandwich structure generally similar to that described in Example 1. The sandwich was glued in a channel frame 47 using a neoprene based adhesive to seal the intumescent material from contact with the atmosphere.

Prior to assembly of the laminate, one face of the second glass sheet 45 was provided with an infra-red reflecting coating 46 of tin oxide doped with fluorine ions which was 4000 Å thick. Such a coating can be obtained as described in Example 6.

When such a panel is located with its reflectively coated face towards a fire, infra-red radiation is reflected back towards the fire and this greatly reduces the risk of propagation of fire due to infra-red radiation through the panel while it remains transparent, and furthermore, increases the time taken for the other surface of the panel to reach a given temperature.

Such an oxide coating has a further advantage in that it is highly transparent to visible light and this is very useful if the panel is to form an interior partition in a building.

As a variation the membrane 43 may be made of polyvinyl chloride instead of polyvinyl butyral, or any other suitable plastic for providing even heat transfer and properly bonding the first and second panels together.

EXAMPLE 8

A panel was constructed as described in Example 7, but in this case the first glass sheet 41 was also given an infra-red reflecting coating prior to assembly. This coating (not shown in the drawing) was of gold, 150 Å thick.

Such a panel affords similar advantages to the panel of Example 7 (except that its transparency to visible light will be reduced) and in addition the coating of gold permits its exposure to solar radiation without any substantial risk of degradation. As a variation of the panel of this or any other Example, one or more of the vitreous sheets may have been given a chemical tempering treatment. A chemically tempered sheet of glass is highly resistant to breakage due to thermal shock.

While the invention has been herein shown and described in what are presently conceived to be the most practical and preferred embodiments, it will be apparent to those of ordinary skill in the art that many modifications may be made thereof within the scope of the invention, which scope is to be accorded to broadest interpretation of the appended claims so as to encompass all equivalent structures and devices.

What is claimed is:

1. A fire-screening glazing panel comprising
    a first structural ply formed by a vitreous sheet,
    a second structural ply formed by a vitreous or plastic sheet,
    a layer of intumescent material between said first and second structural plies, said material being convertible to form a thermally insulating barrier of porous or cellular structure when said panel is subjected to sufficient heat, such as when said panel is subjected to a fire,
    an infra-red reflecting coating disposed on a ply of said panel, said coating being isolated from said intumescent material between said first and second plies and said coating reducing the effects of aging upon said panel if exposed to a heat source, and
    means for holding said plies together to form a panel.

2. A panel as recited in claim 1 wherein said infra-red reflecting coating is disposed on the surface of said first or said second ply opposite the surface thereof in engagement with said intumescent material.

3. A panel as recited in claim 2 wherein said panel comprises a structural ply in addition to said first and second structural plies.

4. A panel as recited in claim 1 wherein said panel comprises a structural ply in addition to said first and second structural plies.

5. A panel as recited in claim 4 wherein said additional structural ply defines with said first and second structural plies an inter-ply space having a pair of ply faces which form a boundary of that space, and wherein one ply face which forms a boundary of said space has an infra-red reflecting coating disposed thereon.

6. A panel as recited in claim 5 wherein another structural ply defines with said first and second structural plies a second inter-ply space having a pair of ply faces which form a boundary of that second inter-ply space, and wherein one ply face which forms a boundary of that second inter-ply space has an infra-red reflecting coating disposed thereon.

7. A panel as recited in claim 5 wherein both of said ply faces which form a boundary of said inter-ply space have an infra-red reflecting coating disposed thereon.

8. A panel as recited in claim 5 wherein another structural ply besides said first and second structural plies has an infra-red reflecting coating disposed thereon.

9. A panel as recited in claim 1 wherein said infra-red reflecting coating comprises a metal coating selected from the group consisting of aluminum, copper, gold, silver, and palladium.

10. A panel as recited in claim 1 wherein said infra-red reflecting coating comprises a metal oxide coating.

11. A panel as recited in claim 10 wherein said infra-red reflecting coating is a coating selected from the group consisting of tin oxide and indium oxide.

12. A panel as recited in claim 10 wherein said metal oxide coating is selected from the group consisting of oxides of silicon, titanium, zirconium, aluminum, and tantalum.

13. A panel as recited in claim 1 wherein said infra-red reflecting coating is a coating selected from the group consisting of metallic sulfides, nitrides, and carbides.

14. A panel as recited in claim 1 wherein more than one infra-red reflecting coating is provided, at least one of said infra-red reflecting coatings selected from the group consisting of metal oxides.

15. A panel as recited in claim 1 wherein more than one infra-red reflecting coating is provided, at least one of said infra-red reflecting coatings selected from the group consisting of aluminum, copper, gold, silver, and palladium.

16. A panel as recited in claim 1 wherein said means for holding said plies together to form a panel comprises bonds bonding said plies and said layer of intumescent material together in face-to-face relation to form a laminate.

17. A panel as recited in claim 16 wherein a plastic membrane is located between said first and second structural plies, and wherein a layer of intumescent material is disposed on either side of said platic membrane in contact with either said first or said second structural ply.

18. A panel as recited in claim 1 wherein said means for holding said plies together comprises a clamping means clamping said plies and said layer of intumescent material together in face-to-face relationship.

19. A panel as recited in claim 1 wherein said intumescent material has a thickness of between 0.1 and 8 mm.

20. A panel as recited in claim 1 wherein a structural ply of said panel comprises a tempered vitreous sheet.

21. A panel as recited in claim 1 wherein said panel is transparent.

22. A panel as recited in claim 1 wherein said layer of intumescent material comprises a layer of hydrated sodium silicate.

23. A panel as recited in claim 1 wherein said layer of intumescent material comprises a layer of material selected from the group consisting of hydrated metal salts of aluminates, plumbates, stannates, alums, borates and phosphates, and hydrated alkali metal silicates.

* * * * *

UNITED STATES PATENT AND TRADEMARK OFFICE
CERTIFICATE OF CORRECTION

PATENT NO. : 4,173,668

DATED : November 6, 1978

INVENTOR(S) : Walther HENTZELT: Hans-Henning NOLTE; and Wolf VON REIS

It is certified that error appears in the above-identified patent and that said Letters Patent is hereby corrected as shown below:

Column 7, line 55, change "15" to --5--.

Signed and Sealed this

Twenty-sixth Day of July 1983.

[SEAL]

Attest:

GERALD J. MOSSINGHOFF

Attesting Officer

Commissioner of Patents and Trademarks